(12) United States Patent
Smallcomb

(10) Patent No.: US 6,484,284 B2
(45) Date of Patent: Nov. 19, 2002

(54) DIGITAL BROADCASTING SYSTEM AND METHOD

(75) Inventor: Joseph Smallcomb, Herndon, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/842,875

(22) Filed: Apr. 27, 2001

(65) Prior Publication Data

US 2001/0034872 A1 Oct. 25, 2001

Related U.S. Application Data

(62) Division of application No. 09/222,836, filed on Dec. 30, 1998, now Pat. No. 6,247,158.
(60) Provisional application No. 60/110,258, filed on Nov. 30, 1998.

(51) Int. Cl.$^7$ ................................................. G06F 11/10
(52) U.S. Cl. ........................................ 714/786; 714/790
(58) Field of Search ................................ 714/786, 790, 714/746; 370/529, 487

(56) References Cited

U.S. PATENT DOCUMENTS

| | | | |
|---|---|---|---|
| 5,283,780 A | | 2/1994 | Schuchman et al. .......... 370/50 |
| 5,566,189 A | * | 10/1996 | Laskowski .................. 714/746 |
| 5,790,566 A | * | 8/1998 | Laskowski .................. 714/746 |
| 5,907,582 A | * | 5/1999 | Yi .............................. 375/259 |
| 5,909,439 A | * | 6/1999 | Kuwabara et al. .......... 370/389 |
| 5,949,796 A | * | 9/1999 | Kumar |
| 5,970,085 A | * | 10/1999 | Yi .............................. 375/200 |
| 6,023,492 A | * | 2/2000 | Norman ....................... 375/341 |
| 6,049,566 A | * | 4/2000 | Saunders et al. ............ 375/220 |
| 6,131,180 A | * | 10/2000 | Ramesh ....................... 714/790 |
| 6,246,698 B1 | * | 6/2001 | Kumar |

OTHER PUBLICATIONS

German Patent Document, entitled Apparatus and Method for Transmitting Information and Apparatus and Method for Receiving Information, Schoppe & Zimmermann, pp. 1–35, undated.

* cited by examiner

Primary Examiner—Phung M. Chung
(74) Attorney, Agent, or Firm—Jim Zegeer

(57) ABSTRACT

Apparatus and method of achieving diversity in reception of plural digital broadcast signals. A stream of a complete set of code bits is generated from one or more sources of data bits. A first Critical Subset of code bits is chosen or selected for a first channel (e.g. a specified puncturing pattern is applied to the stream of a complete set of code sets). A second (e.g. alternative) Critical Subset of code bits is chosen or selected for a second channel (e.g. a second or alternative puncturing pattern is chosen for the second channel). Further alternative Critical Subsets may be chosen for any additional channels. All the channels are transmitters, some can incorporate time delay to achieve temporal diversity. Moreover, the order of transmitting the code bits on each channel can be different (for example, the interleaving depths can be different). At the receiver, the stream of Critical Subsets of code bits for all of the channels are simultaneously received and a reconstruction of a complete set of code bits accomplished and the reconstructed code and may be inserted into a single Viterbi decoder. Various weighting functions and reconstruction algorithms are disclosed.

6 Claims, 8 Drawing Sheets

DIGITAL BROADCASTING SYSTEM AND METHOD

REFERENCE TO RELATED APPLICATION

The present application is a division of application Ser. No. 09/222,836 filed Dec. 30,1998 and entitled DIGITAL BROADCASTING SYSTEM AND METHOD, now U.S. Pat. No. 6,247,158.

This application includes the subject matter of provisional application Ser. No. 60/110,258 filed Nov. 30, 1998 and entitled DUAL CHANNEL DIVERSITY SYSTEM.

The present invention relates to digital broadcasting systems and methods which achieve multi-channel code diversity by way of decomposition of a single forward error corrected code (FEC).

BACKGROUND OF THE INVENTION

Introduction

A general strategy for sending digital data reliably through a communications channel of varying quality is to send redundant information so that a stream of transmitted source bits can be recovered without error at a receiver even though the communications channel may be erratic. This is particularly important for one-way broadcasts of audio and multimedia that must be received in real-time with a low error rate. In such cases, a low error rate is achieved partly through the use of forward error correction (FEC) code.

The mobile satellite broadcast channel is such an erratic channel since, particularly at lower elevations angle, the line-of-sight (LOS) between a mobile vehicle and the satellite is often obstructed by trees, buildings, signs, utility poles and wires. Such obstructions attenuate and distort a communications waveform, thereby causing high error rates for brief and longer periods of time. A common approach to reliable satellite broadcasting is to implement spatial diversity by broadcasting duplicate signals from satellites at two different orbital locations. In addition, temporal diversity may also be used by delaying one signal by a fixed amount of time. Indeed, some satellite systems also rely upon terrestrial repeating of the satellite signal which is yet another source of diversity. FIG. 1 illustrates a satellite broadcasting system that has dual diversity from 2 satellites (101 and 102) and is augmented by terrestrial repeating (104), thereby providing 3-fold diversity. The origin of the satellite broadcasts is the hub station (103). Both of the satellites and the terrestrial repeaters broadcast the same source data, but the channels that the data travels over are different so that diversity is provided. A diversity radio in the vehicle (104) would in general receive all the signals (satellite and terrestrial) and use this to reconstruct the source data as faithful as possible based upon the reception from the multiple sources.

Current State of the Art for Diversity

FIG. 2 illustrates a generic implementation of diversity using two channels A and B. Although the discussion here is limited to two channels (A and B), all of the concepts put forth are applicable to 3 or more diverse channels. For a broadcast satellite application, signals A and B would be sent by two different satellites, and the channels for those signals are denoted also denoted as A and B. At the outset, each individual channel has some diversity due to the fact that Encoding (201) adds redundancy to a single data stream so that the source bits can be recovered without error even though limited numbers coded bits may be lost over the channel. Also, additional diversity (spatial) is used that involves modulating (Mod 204) duplicate streams of data over independent channels A and B. Finally, as illustrated in FIG. 2, time diversity is also used by implementing a fixed Time Delay (203) on signal B at the transmitter, and compensating for this with a comparable Time Delay (253) at the receiver. The diversity receiver has two demodulators (Demod-254) to receive the signals on Channel A and B simultaneously. Finally, the diversity receiver implements Combining (252) of the bits received on Channels A and B and Decoding (251) of the recovered code bits.

Note that in the implementation of diversity illustrated in FIG. 2, encodes the data stream and places identical coded data streams on both A and B channels. In this case, the diversity receiver captures the same coded bits from each channel and then implements a combining scheme to come up with a "best" estimate for each received code bit. Such combining may involve ongoing calculation of a quality metric for data on channels A and B and selecting the coded bits that are carried on the best channel at any point in time. Alternatively, combining may be more sophisticated in which the quality metric is used to generate weights for the code bits arriving on channels A and B and thereby constructing a summed estimate that maximizes the signal to noise composite signal. Such an approach is referred to as maximum ratio combining (MRC).

A widely used implementation of an encoder is a convolutional code. The typical construction of a convolutional code is illustrated in FIG. 3. The source bits are input into a digital shift register from the left, and the coded bits are constructed by a sum of the current and 6 most recent input source bits as weighted by a generator polynomial over a Galois Field. This implementation generates a rate 1/2 code because it outputs 2 code bits (x and y) for every input source bit.

It is customary to construct less redundant codes from such a code by puncturing (deleting) output code bits in a particular pattern. Table 1 illustrates the construction of a rate 3/4 code from a rate 1/2 code. Three source bits are input and the output is 6 code bits: $\{x(i), y(i), i=1, 3\}$. Two code bits, $x(2)$ and $y(1)$ are deleted, leaving 4 output code bits for 3 input code bits, thus making a rate 3/4 code.

TABLE 1

Construction of a Rate 3/4 Code by Puncturing a Rate 1/2 Code

| Polynomial | Code Bits Pre-puncturing | | | Code Bits Post-puncturing | | |
|---|---|---|---|---|---|---|
| g1 | x(3) | x(2) | x(1) | x(3) | P | x(1) |
| g2 | y(3) | y(2) | y(1) | y(3) | y(2) | P |

Table 2 illustrates the use of this rate 3/4 code in a standard implementation in which the puncturing for both A and B channels is identical. Therefore the coded bits on both channel A and B are also identical.

TABLE 2

Standard Implementation of a Single Rate 3/4 Code on Diverse Channels

| Channel | Polynomial | Code Bits Pre-puncturing | | | Code Bits Post-puncturing | | |
|---|---|---|---|---|---|---|---|
| A | g1 | x(3) | x(2) | x(1) | x(3) | P | x(1) |
| B | g1 | same for Channel A | | | same for Channel A | | |
| A | g2 | y(3) | y(2) | y(1) | y(3) | y(2) | P |
| B | g2 | same for Channel A | | | same for Channel A | | |

The standard implementation of a punctured convolutional code implemented in the context of spatial and temporal diversity with dual channels is illustrated in FIG. 4. At the transmitter, the Convolutional Encoder (401) generates the code bits from input source bits. Some of the code bits are deleted by the Puncture element (402) prior to modulation by the Mod element (404). The diversity receiver again has two demodulators (Demods-454) to simultaneously receive the broadcasts on both Channel A and B. The retrieved code bits from both A and B are input to the Combining element (452b) which aligns, weights and combines redundant information about a received bit on the two channels. The intent of most combining algorithms is to maximize the signal to noise ratio of the combined signal. After combining, the stream of recovered code bits are input to the De-puncture element (452a) which inserts the erasures into the slots of the code bits that were deleted in the Puncture element (402) of the transmitter.

THE PRESENT INVENTION

An object of the invention is to provide an improved digital information broadcasting system and method. Another object of the invention is to provide code diversity in a digital broadcast system. Another object of the invention is to provide an apparatus and method of achieving diversity in reception of plural digital broadcast signals.

Briefly, according to the invention a stream of a complete set of code bits is generated from one or more sources of data bits. A first Critical Subset of code bits is chosen or selected for a first channel (e.g. a specified puncturing pattern is applied to the stream of a complete set of code sets). A second or alternative Critical Subset of code bits is chosen or selected for a second channel (e.g. a second or alternative puncturing pattern is chosen for the second channel). Further alternative Critical Subsets may be chosen for any additional channels. All the channels are transmitters, some can incorporate time delay to achieve temporal diversity. Moreover, the order of transmitting the code bits on each channel can be different (for example, the interleaving depths can be different). At the receiver, the stream of Critical Subsets of code bits for all of the channels are simultaneously received and a reconstruction of a complete set of code bits accomplished and the reconstructed code is inserted into a decoder.

BRIEF DESCRIPTION OF THE DRAWINGS

The above and other objects, advantages and features of the invention will become more clear when considered with the following specification and accompanying drawings wherein.

DETAILED DESCRIPTION OF THE INVENTION

Figure 1:
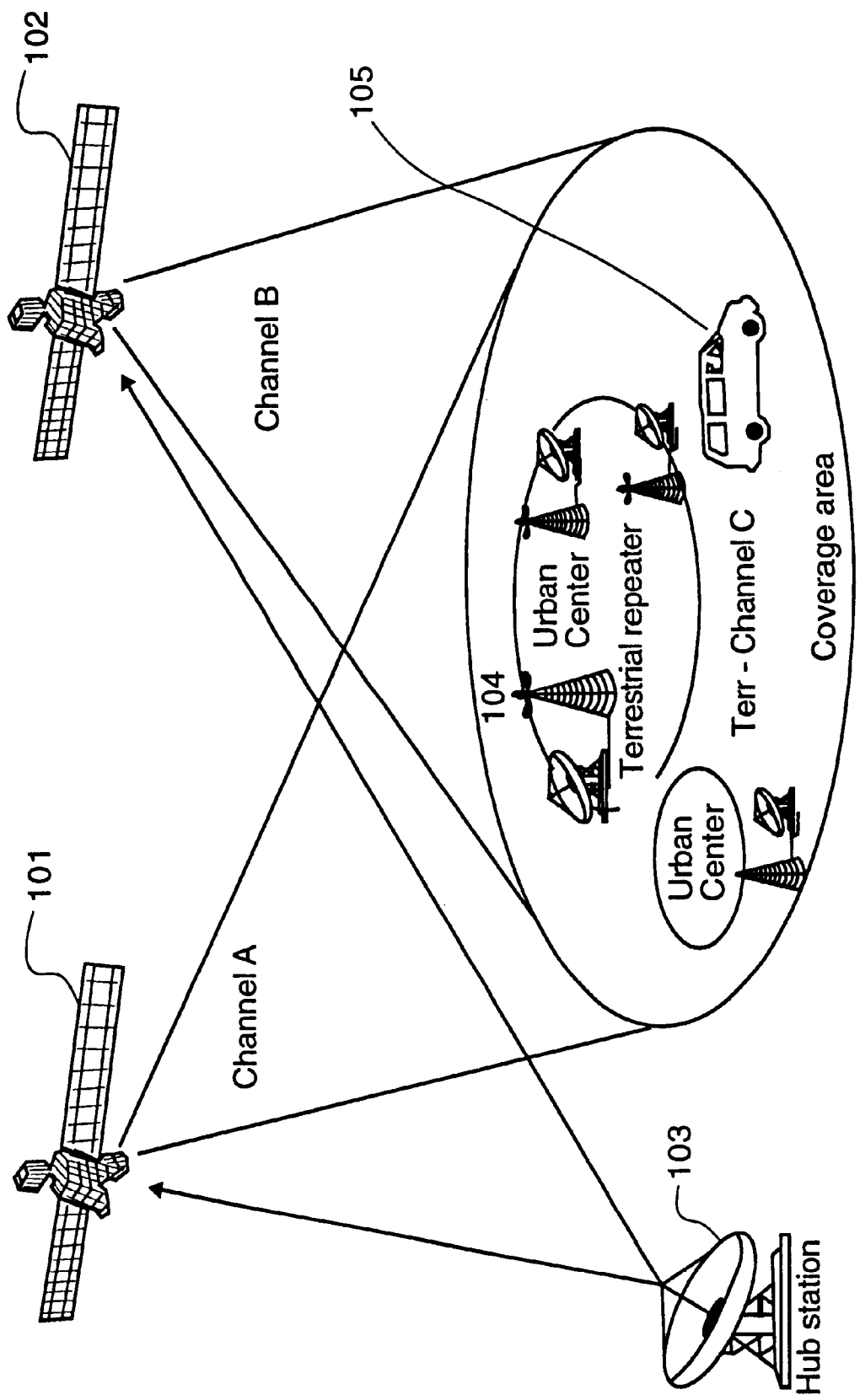
FIG. 1 is a pictorial illustration of diversity broadcasting System.
Figure 2:
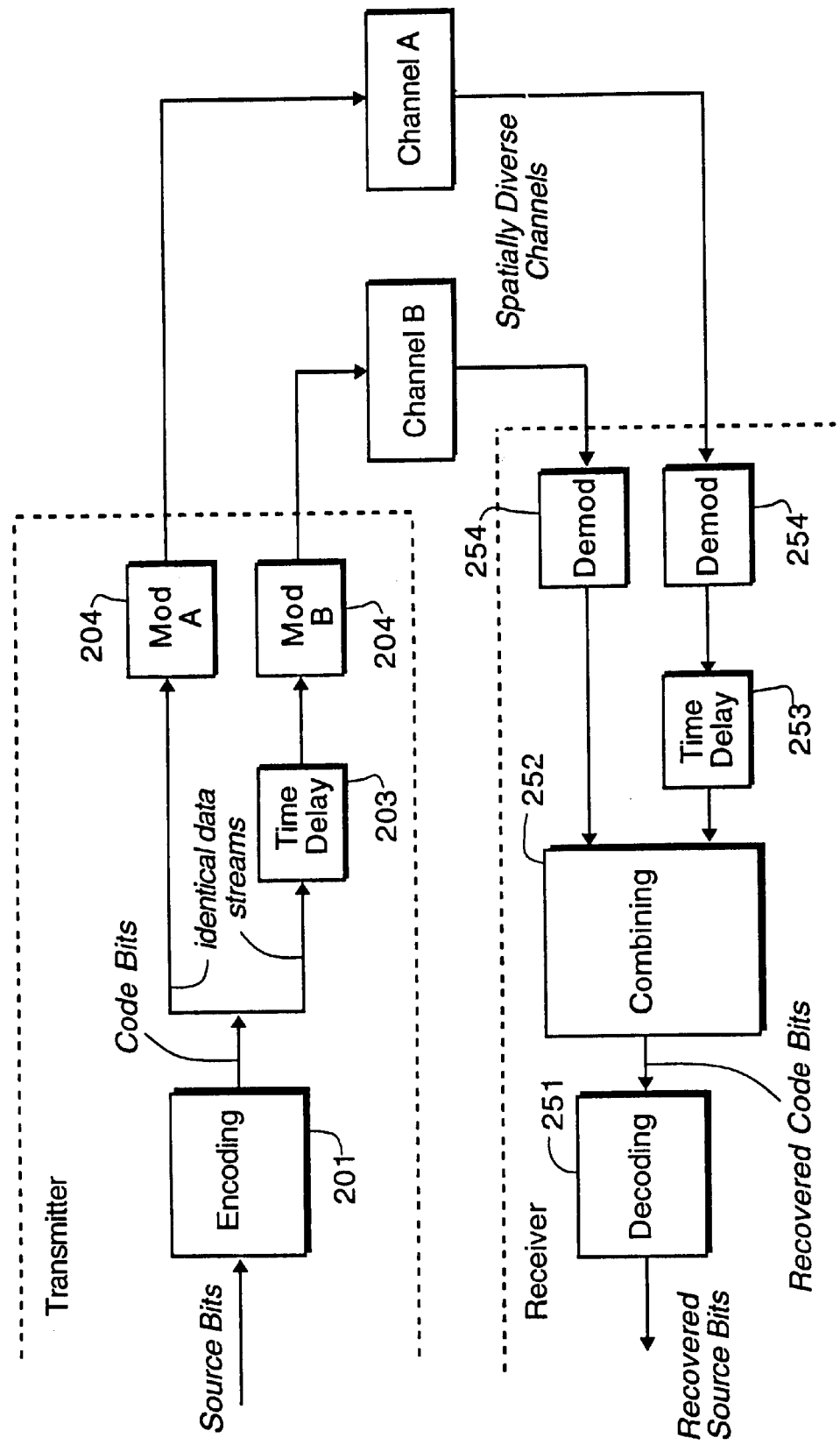
FIG. 2 illustrates a generic diversity Implementation with current state of the art.
Figure 3:
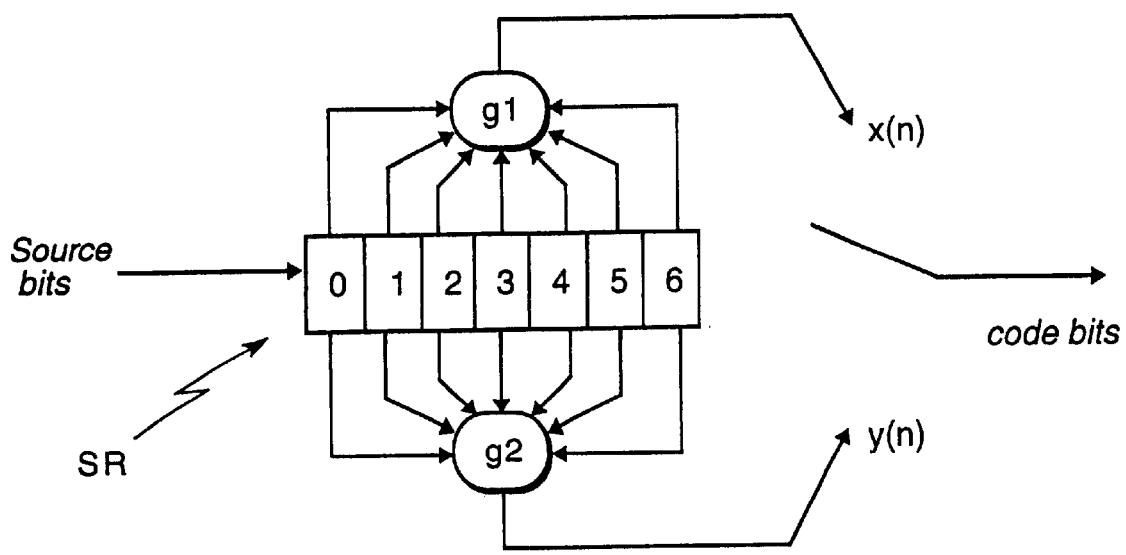
FIG. 3 illustrates a typical construction of a constraint length 7, rate ½ convolution code.
Figure 5:
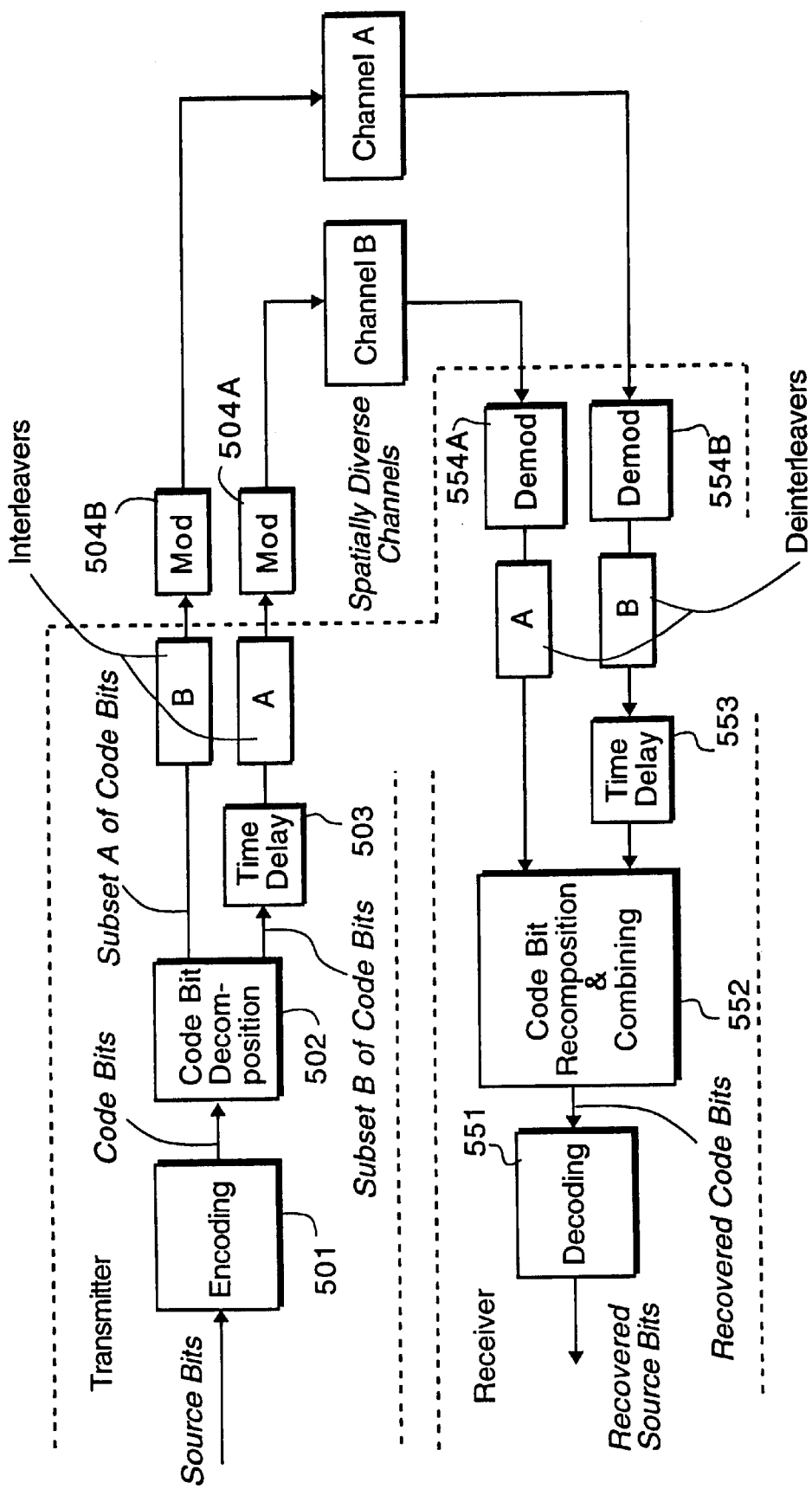
FIG. 5 is an illustration of an embodiment of the invention implementing diversity on dual channels by selecting different subset of code bits for channels A and B.

FIG. 5 illustrates a generic example of the invention. At the transmitter, the source bits enter a single Encoder (501) in which a set of output code bits are generated from a set of input source bits. For explanation purposes, the whole set of output code bits will be referred to as the Complete Set. The Encoder sends the Complete Set to the Code Bit Decomposition (CBD) functional element (502). The CBD decomposes the Complete Set into two Critical Subsets A and B. The Subsets are called critical, because even if the receiver faithfully captures only one of the subsets, this is sufficient to regenerate the original source bits. The Subsets A and B may be totally disjoint (i.e., share no common code bits of the Complete Set) or may contain some common elements of the Complete Set. Note that the critical difference between the transmitter system in FIG. 5 vs. that of FIG. 2 is that the code bits sent on Channels A and B are not identical.

At the receiver, the each stream of code bits on both Channels A and B are captured and input to the Code Bit Recomposition and Combining (CBRC) element (552). The CBRC faithfully assembles the Complete Set to the maximum extent possible via a process of weighting and combining received information. The CBRC then sends the recovered code bits to Decoding element (551). For each transmitted code bit there are 3 alternative outcomes at the receiver. Table 3 explains the causes and receiver behavior for each alternative:

The scope of the invention illustrated in FIG. 5 includes the following concepts at the transmitter:
  generation of a stream of a Complete Set of code bits from source data bits
  choosing a Critical Subset of code bits for channel A (e.g., specified puncturing pattern)
  choosing an alternative Critical Subset of code bits for channel B (e.g., alternative puncturing pattern), and similarly for additional channels
  the order of transmission of the code bits on each channel can be different (e.g., different interleaving depths).

The scope of the invention includes the following concepts at the receiver:
  simultaneous reception of a stream of code bits on channels A and B and additional channels if present,
  reconstruction of the Complete Set of code bits in general accord with the logic of Tables 3 and 4 and using specific algorithms described below,
  insertion of reconstructed code set into a single Viterbi decoder.

Table 4 lists the general types of combining/depuncturing and their weighting scheme that corresponds to the outcomes of Table 3 above. The weighting type is a function of the code diversity technique used and whether a code bit was received on multiple channels.

TABLE 3

Alternative Outcomes and Behavior of a Diversity Receiver

| Alternative | Causes | Receiver Behavior |
|---|---|---|
| 1. the code bit is captured by both channel demodulators | code bit is transmitted in both A and B Subsets and is successfully received on both channels | Receiver constructs a "best" estimate of the code bit from A+B based upon quality indicators on each channel; Receiver constructs new code bit by combining (e.g., adding) the recovered code bits from Channel A and B. The recovered code bits could be weighted based upon quality indicators from each Demodulator |
| 2. the code bit is captured by only one channel demodulator | code bit is transmitted in both A and B Subsets but is successfully received on only one channel<br>code bit is in transmitted only one channel subset and is successfully received on that channel | Receiver uses the estimate of the code bit from the single channel and weights is with a quality indicator for the channel; Receiver uses the recovered code bit from the single channel. The recovered code bits could be weighted based upon quality indicators from each Demodulator |
| 3. the code bit is captured by neither channel demodulator: | code bit is transmitted in both A and B Subsets but is not successfully received on either channel<br>code bit is transmitted in only one channel subset and is successfully received on that channel<br>code bit is not part of either subset | Receiver treats this code bit as a puncture |

TABLE 4

Weighting Approach for Alternative Cases

| Alternative | Weighting Approach | Weighted Output |
|---|---|---|
| 1. Received on Channels A and B | Weight the bits received on A and B with $\alpha$ and $\beta$, respectively; each is a function of the SNR on both Channels A and B | $\alpha^* x(n)_A + \beta^* x(n)_B$ |
| 2. A Received on Channel A Only | Weight the bits received on A with $\alpha$; $\alpha$ is a function of the SNR on both Channels A and B | $\alpha^* x(n)_A$ |
| 2. B Received on Channel B Only | Weight the bits received on B with $\beta$; $\beta$ is a function of the SNR on both Channels A and B | $\beta^* x(n)_B$ |
| 3. Received on neither Channel A nor B | Treat bits as Punctures | 0 |

It is important to note in Alternatives 2.A and 2.B of Table 4 that, even though a code bit is received on only one channel, its weight is determined by the SNR on both channels. This is an important feature of the invention and yields a significant performance gain.

Illustration of an Embodiment of the Invention Using a Convolutional Code

Figure 4:
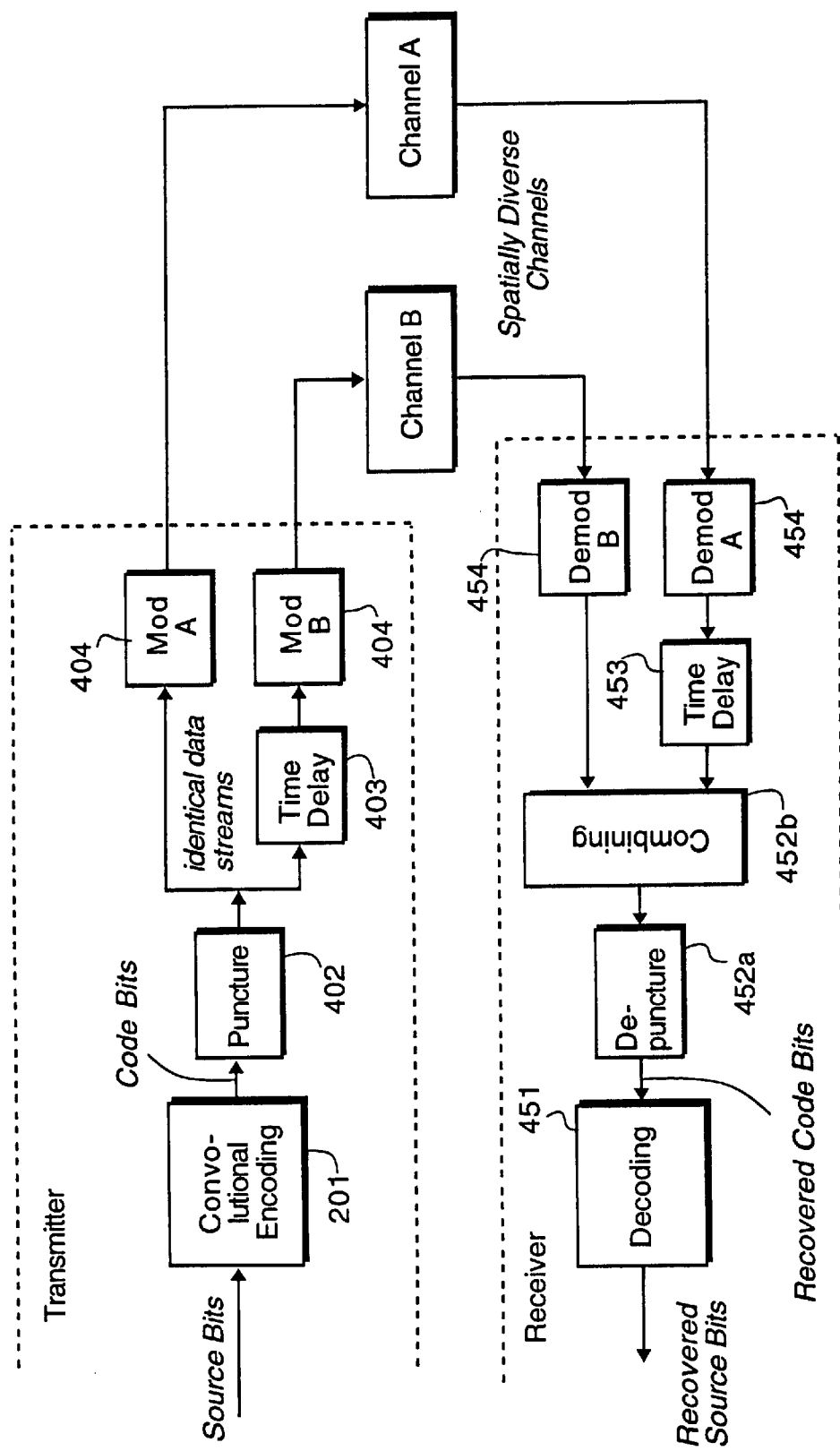
FIG. 4 is an illustration of diversity implementation with punctured convolutional code.
Figure 6:
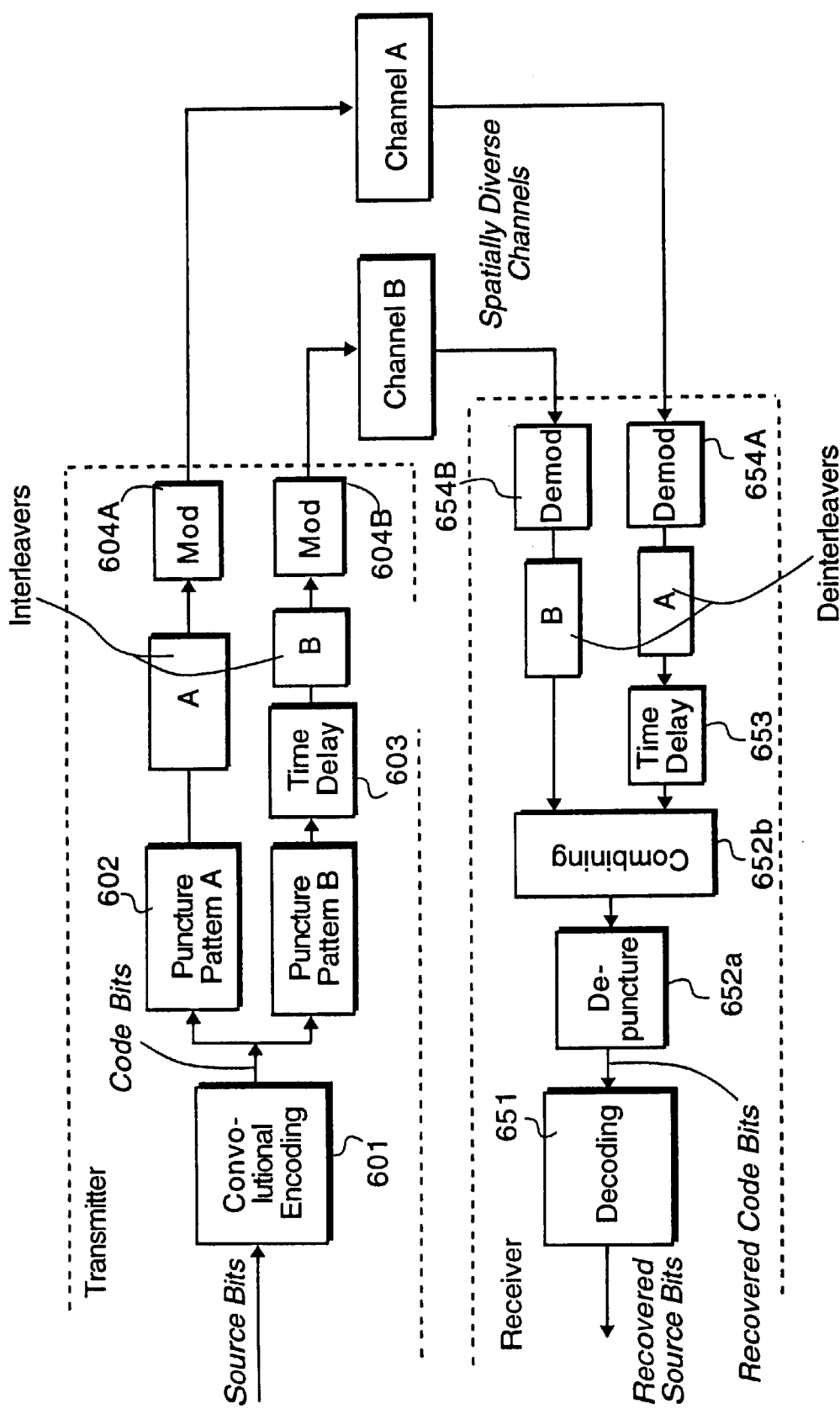
FIG. 6 is an illustration of an embodiment of the invention implementing diversity on dual channels by selecting different puncturing patterns of a single convolutional code for Channels A and B.

FIG. 6 illustrates the invention using a convolutional code at the transmitter. At the transmitter, FIG. 6 shows a single Convolutional Encoder (601) that generates a Complete Set of code bits from input source bits. At this point, the transmit stream is broken into paths A and B which undergo different processing. Path A, destined for Channel A is punctured with a pattern (A) in the Puncture element (602) and Path B is punctured with a different pattern (B) by another copy of the Puncture element. The critical difference between the system in FIG. 6 versus that of FIG. 4 is that the puncture patterns on Channels A and B are different.

Table 5 gives an example of suitable subsets for Channel A and B based upon different puncturing of a common rate ½ code that constructs a rate ¾ code on each channel. Note that the code bits for both Channel A and B are the same prior to puncturing. However, after puncturing, the Channel A code bit subset is {x(3), x(1), y(3), y(2)} and the Channel B subset is {x(3), x(2), y(2), y(1)}. Note then that in this example ⅓ of the code bits, x(3) and y(2), are carried by both channels, while ⅔, x(1), x(2), y(1) and y(3), are carried by only a single channel. Analysis has shown that the benefit of this type of code diversity can improve performance by up to 2 dB.

TABLE 5

Example of Transmitting Different Subsets of Code Bits Selected for Channels A and B

| Channel | Polynomial | Code Bits Pre-puncturing | | | Code Bits Post-puncturing | | |
|---|---|---|---|---|---|---|---|
| A | g1 | x(3) | x(2) | x(1) | x(3) | P | x(1) |
| B | g1 | same as Channel A | | | x(3) | x(2) | P |
| A | g2 | y(3) | y(2) | y(1) | y(3) | y(2) | P |
| B | g2 | same as Channel A | | | P | y(2) | y(1) |

While the transmitter creates different code bit subsets and transmits them on different channels, the receiver captures these bits and processes them in a combined process. Note that since the receiver may receive x(3) on both channel A and B, its estimate of x(3) is determined from $x(3)_A$ and $x(3)_B$. Alternatively, its estimate of x(2) is based only on $x(2)_B$ since it is only received on that channel. However, in both cases, the weighting factors for the estimates are determined by SNR metrics for both Channel A and B. This is described in the next section.

TABLE 6

Receiver Processing of Received Code Bits on Channel A and B to Derive Best Composite Signal

| Channel | Code Bits Post-puncturing | | | | | |
|---|---|---|---|---|---|---|
| A | x(3) | P | x(1) | y(3) | y(2) | P |
| B | x(3) | x(2) | P | P | y(2) | y(1) |
| A + B | select best or MRC* | x(2) via B* | x(1) via A* | y(3) via A* | select best or MRC* | y(1) via B* |

*Weighted with coefficients determined from both A and B quality metrics

DESCRIPTION OF COMBINING ALGORITHMS

Figure 7:
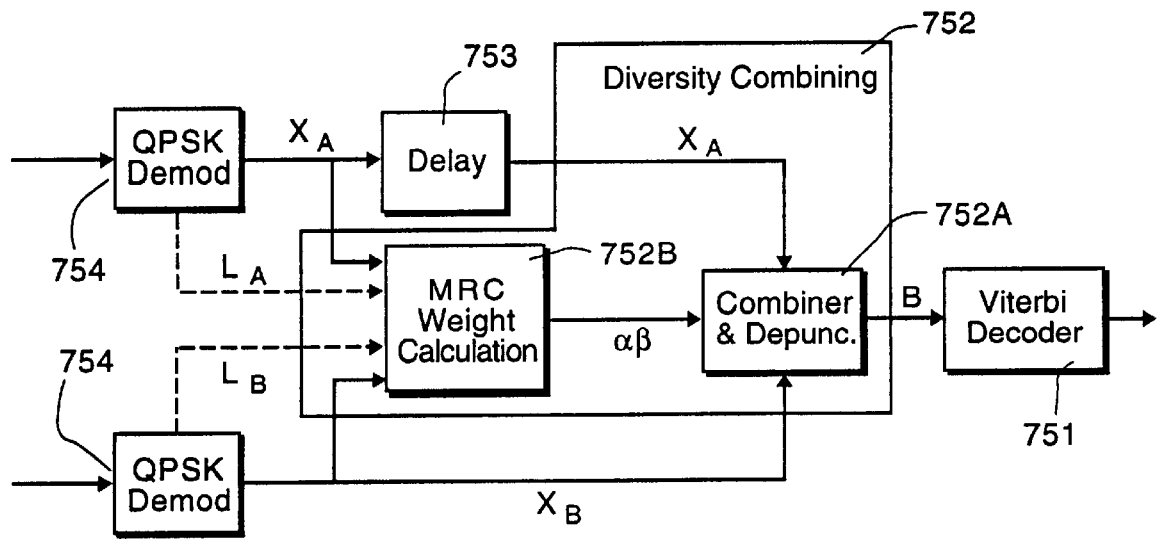
FIG. 7 illustrates a pre-Viterbi diversity combining receiver block diagram.
Figure 8:
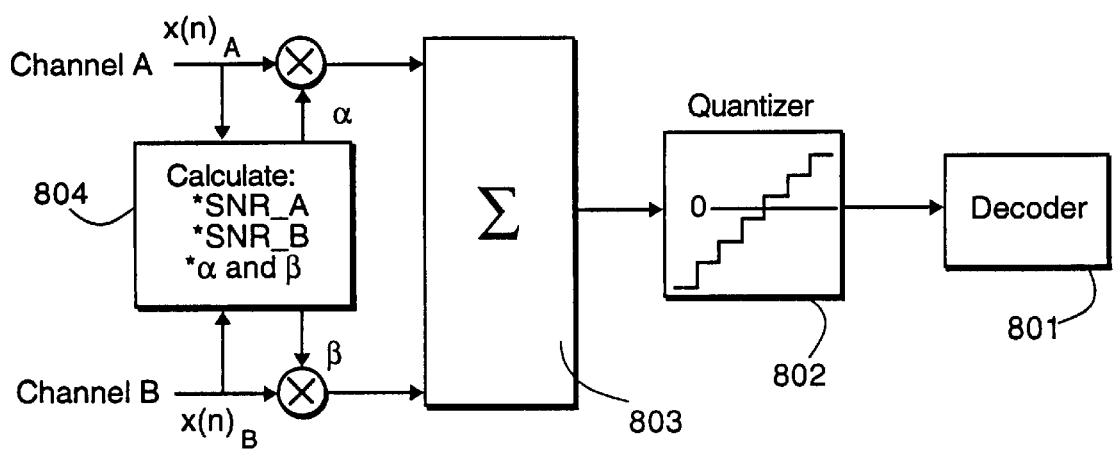
FIG. 8 illustrates weighting of bit x(1) received on both A and B channels.
Figure 9:
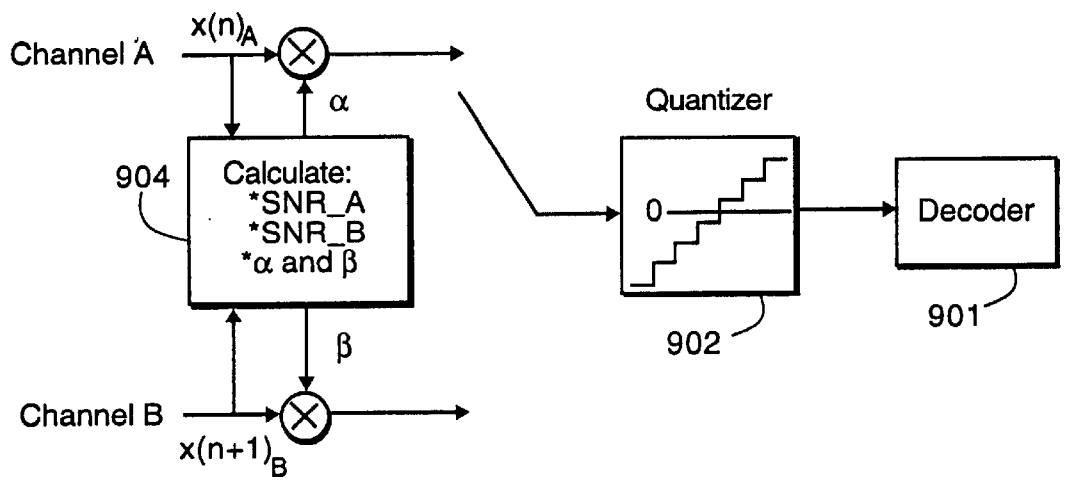
FIG. 9 illustrates weighting of adjacent bits x(1) and x(2) received on different channels.

General Approach The pre-Viterbi code diversity combining receiver is illustrated in FIG. 7 for QPSK waveforms that are convolutionally encoded. In general, it involves taking the QPSK symbols from the Demods (754) of the different channels (A and B), calculating a quality (e.g., MRC) metric, weighting the symbols based on this quality metric and combining the two signals. The calculation of the quality metric and weighting coefficients is carried out in the MRC Weight Calculation (MWC) element (752b). In general, the MWC calculates the quality metric and the weights $\{\alpha$ and $\beta\}$ based upon the input sampled code bits $\{X_A$ and $X_B\}$ as well as signal lock indicators $\{L_A$ and $L_B\}$ for each demodulator. The Combiner & Depuncture (C&D) element (752a) uses the $\alpha$ and $\beta$ inputs and constructs an optimum estimate for each code bit. The function of the C&D also includes appropriate quantization of the code bit estimate for input of soft decisions into the Viterbi Decoder (751). This is an important factor because the weighting coefficient determines the distribution of received code samples over the chosen quantization which in turn determines the influence that the input code bits have on the Viterbi metric that drives the decision on source bits that are the outputs of the Viterbi Decoder. FIGS. 8 and 9 show additional detail of the Diversity Combiner that includes quantization. FIG. 8 is applicable to a case in which a single bit is received on both A and B channels. The bit stream of both A and B enter the Calculate element (804) which calculates the SNR (which is the quality metric for each channel). The weighting coefficients are then calculated from the SNRs and are used to scale the current bit. The two resultant terms are then summed (803) and the sum is input to the Quantizer (802). The output of the Quantizer is a soft decision variable (SDV) that is required by the Viterbi Decoder (801). Note that a low weight applied to the SDV forces most of the out put values of Quantizer to be in the bins closest to zero and in this way, the influence on the Viterbi metric is felt and drives the decoding of source bits.

FIG. 9 is applicable to a case in which a single bit is received on only one channel. In this example, $x(n)_A$ is received on Channel A and $x(n+1)_B$, an adjacent bit, is received on Channel B. As in the Combiner in FIG. 8, the Calculate element (904) calculates the SNR of each channel based upon the input bit stream. The weighting coefficients are again calculated from the SNRs and are used to scale the current bit. In contrast with the case in FIG. 8, after weighting, the bits are then serially put into a Quantizer (902). Note that the effect of a low weight is to drive the quantizer to the levels closest to 0 so that the impact on the metric of the Viterbi Decoder (901) is minimized. This is the way that the weighting has its impact on the decoded source bits even though the weighting is applied to different (adjacent and nearby) bits rather than the same bits as in the system in FIG. 8.

The detailed weighting algorithm (and its calculation) can be performed in several different ways. The approach given is described below is based on a Maximal Ratio Combining (MRC) algorithm. Let $SNR_A$ and $SNR_B$ represent the Signal to Noise Ratio of the A and B Channels, respectively. Assuming that the QPSK symbols are normalized, the MRC weight for the early channel, $\alpha$, is the following.

$$\alpha = \frac{SNR_A}{SNR_A + SNR_B} = \frac{1}{1 + SNR_B/SNR_A},$$

It can be shown that in this case, the MRC weight for the late channel, A is simply $$\beta = 1 - \alpha$$

Algorithm Background

Soft Decision Variable

The QPSK Demodulator uses 2's complement format or equivalent in most of calculations. The output of the QPSK Demodulator may be quantized to a 4 bit Soft Decision Variable (SDV) to minimize the memory requirements. The optimum method of quantizing (for the Viterbi Decoder) is to represent it symmetrically about the null value, so that there are equal number of levels representing "ones" and "zeros". A typically representation for SDV is odd integer which is illustrated in Table 7. It is also optimum to clip the Viterbi Decoder input signal at the AGC level. However, for proper weighting of and SDV clipping should be implemented after the MRC weighting. Therefore, the output of the QPSK Demod should be clipped at twice the AGC level.

Distance Metric

The distance metric, d, is a measurement of the distance from the "hard decision" (i.e. +/-AGC level). Table 7 illustrates the distance metric relationship to the SDV, assuming it is clipped to twice the AGC level:

TABLE 7

| | Binary Formats | | | | | | | | | | | | | | | |
|---|---|---|---|---|---|---|---|---|---|---|---|---|---|---|---|---|
| Binary Offset | 0 | 1 | 2 | 3 | 4 | 5 | 6 | 7 | 8 | 9 | 10 | 11 | 12 | 13 | 14 | 15 |
| Soft Dec. Var. | -15 | -13 | -11 | -9 | -7 | -5 | -3 | -1 | 1 | 3 | 5 | 7 | 9 | 11 | 13 | 15 |
| Distance | 3 | 2 | 1 | 0 | 0 | 1 | 2 | 3 | 3 | 2 | 1 | 0 | 0 | 1 | 2 | 4 |

Let the variable, $m_d$, be the mean distance metric of a Soft Decision Variables (SDV). For high SNR, d is approximately a Rayleigh random variable with one degree of freedom. It can be shown that under this case, the relationship between d and SNR is:

$$SNR = \frac{2}{\pi} m_d^{-2}$$

For an arbitrary value of X, let $$SNR = X^g$$

Then the relationship between g and $m_d$ for the case of high SNR is $$g=\log_x(2/\pi)-2\log_x(m_d)$$

Figure 10:
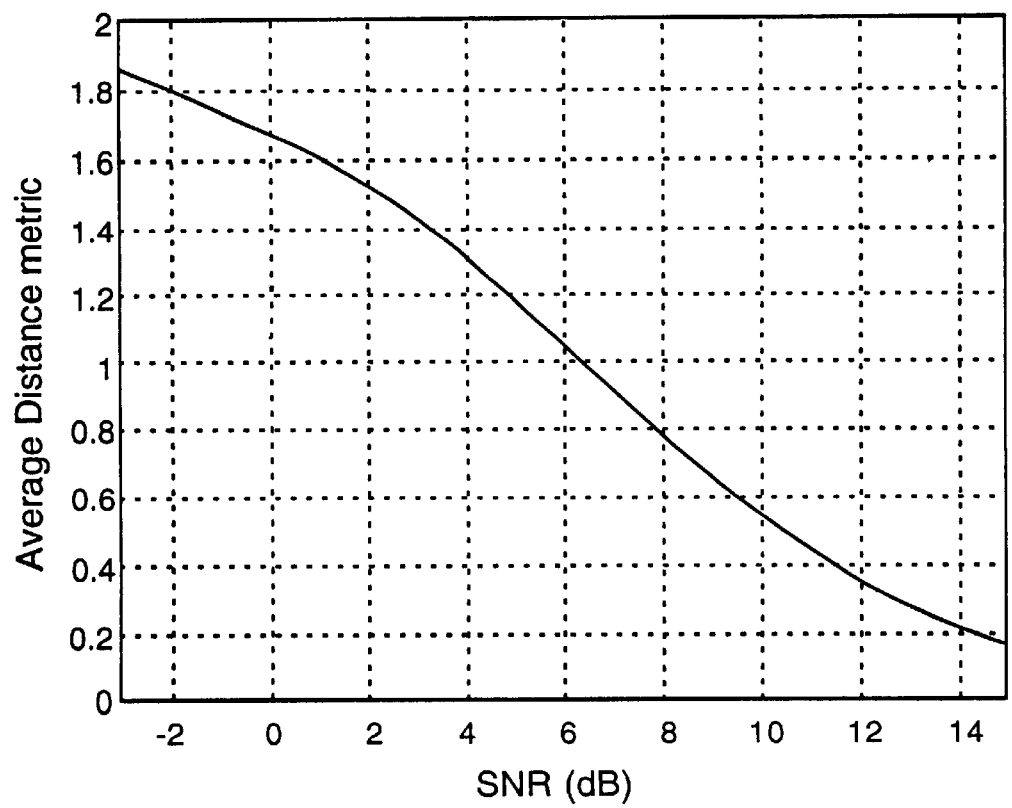
FIG. 10 is a graph of simulation results of average distance metric vs. SNR.

The above calculation shows the basic relationship between g and $m_d$, but it does not take into account the effects of a) clipping and quantizing of the SDV or b) non-Rayeigh (and non-trivial) Distribution at low SNRs. Therefore, for a more accurate relationship, empirical analysis is required over the SNR range of interest. For the above-mentioned algorithm and over the SNR range of −3 to 15 dB, the analysis shows that relationship between g and d is close to linear and monotonic (see FIG. 10). This implies that a simple Look Up Table (LUT) is suitable for the conversion from $m_d$ to g.

an arbitrary upper limit ($SNR_{max}$) is used to limit the weighting factor values. Typically, $SNR_{max}$ is set at a level where diversity is not required (i.e., the decoder is virtually error free with code bits from a single channel). This method has the advantage of applying the weights immediately and therefore not requiring memory if time diversity is used (see FIG. 6).

Table 8 (Column 4) also illustrates efficient formulas for calculating the MRC Weighting factors ($\alpha$ and $\beta$) from SNR variables ($g_A$ and $g_B$) for each of the methods. Each formula is based on the difference between $g_A$ and $g_B$. Again a simple LUT can be used instead of direct calculation.

TABLE 8

| Method | Description | General Algorithm (Alternative weighting factors) | Efficient Formula |
|---|---|---|---|
| 1 | Normalized Relative Weights | $\alpha = \dfrac{SNR_A}{SNR_A + SNR_B}$  $\beta = \dfrac{SNR_B}{SNR_A + SNR_B}$ | $\alpha = \dfrac{1}{1+X^{g_B-g_A}}$  $\beta = 1 - \alpha$ |
| 2 | Relative Weights | For $SNR_A \leq SNR_B$  $\alpha = SNR_A/SNR_B$  $\beta = 1$  For $SNR_A > SNR_B$  $\alpha = 1$  $\beta = SNR_B/SNR_A$ | For $g_A \leq g_B$  $\alpha = X^{g_A-g_B}$  $\beta = 1$  For $g_A > g_B$  $\alpha = 1$  $\beta = X^{g_B-g_A}$ |
| 3 | Absolute Weights | $\alpha = \dfrac{SNR_A}{SNR_{max}}$  $\beta = \dfrac{SNR_B}{SNR_{max}}$ | $\alpha = \begin{cases} X^{g_A-g_{max}} & g_A \leq g_{max} \\ 1 & g_A > g_{max} \end{cases}$  $\beta = \begin{cases} X^{g_B-g_{max}} & g_B \leq g_{max} \\ 1 & g_B > g_{max} \end{cases}$ |

Computing MRC Weighting factors

The calculation of the MRC Weighting factors ($\alpha$ and $\beta$) are based primary from SNR variables ($g_A$ and $g_B$) described in previous sections. FIG. 7 illustrates a possible use of the Lock indicators in this computation. The lock indicator would override the SNR variable by setting it to the minimum value (e.g., $g=\log_x(SNR_{mim})$) and cause the equivalent of an erasure.

The key assumption to this algorithm discussion is that each QPSK Demodulator has a coherent digital automatic gain control (AGC). This is primarily required for optimum QPSK Demodulator and Viterbi Decoder performance. It also has the added benefit of normalizing the desired signal power. This allows the MRC weight to be based on the SNR (i.e., $1/\sigma^2$ or $m^2/\sigma^2$) rather than $m/\sigma^2$ metric.

Columns 1–3 of Table 8 demonstrate several approaches of generating weighting factors based on SNR. The selection of the best method depends primarily on a) the possible weighting approaches described in Table 4, b) the SDV format and c) the implementation of the Viterbi decoder. Method 1 employs a relative [to SNR] weighting scheme that normalizes the combined output symbol. It is best suited to cases when a code bit is present on both channel A and B. Method 2 is similar to Method 1 except that it always weights the channel with the highest SNR by a factor of 1. This method is best suited for case when the code bit is only present on a single channel (i.e., Only Channel A or B). Method 3 weights the code bits of a given channel based only on the SNR of that channel. To simply the calculation, Interleaving Diversity The performance gain of channel (e.g., convolutional) coding is typically dependant on a memoryless channel. The use of interleaving to transform a channel with memory to a memoryless channel is a powerful technique in achieving the maximum coding gain. However, there are still cases where interleaving one way is better than another depend on the channel (memory). To add another degree of robustness to the system, different interleaver can optionally be used on different channels. The simplest example of this is to have different block interleavers (on channels A and B) with different interleaver depths and/or widths. (See FIGS. 5 and 6.)

It will be readily apparent to those skilled in this art from the detailed description and drawings that which is shown and described is only the preferred embodiment of the invention and the best mode contemplated for carrying out the invention. The invention, therefore, is capable of other and different embodiments, and its several details are capable of modifications in various obvious respects, all without departing from the invention. Accordingly, the drawings and description are to be regarded as illustrative in nature, and not as restrictive.

What is claimed is:

1. In a digital radio broadcast system in which a string of encoded digital information bits is commonly supplied to a plurality of radio broadcasting channels, the improvement wherein each radio broadcasting channel includes means to puncture the encoded data supplied to it, each said means to puncture having a different puncture pattern supplied thereto to achieve code diversity in the encoded data broadcast by each broadcast channel, respectively, and said radio broadcasting channel are spatially diverse.

2. The digital radio broadcast system defined in claim 1, including at least one radio receiver for simultaneously receiving at least a pair of said plurality of broadcasting channels and depuncturing element to depuncture the encoded data.

3. A digital broadcast radio receiver for simultaneously receiving at least a pair of said plurality of broadcasting channels as defined in claim 1, said radio receiver having depuncturing element for depuncturing the encoded data in said at least a pair of said plurality of broadcasting channels.

4. The digital radio broadcast system defined in claim 3 including a digital broadcast radio receiver for simultaneously receiving at least two of said plurality of radio broadcast channels, means to deconvolute and depuncture the received encoded data and output a single set of encoded data to a utilization device.

5. In a digital radio broadcast system in which digital information bits are encoded by a convolutional encoder and commonly supplied to a plurality of radio broadcast channels, each broadcast channel having means to puncture the convolutionally encoded data supplied to it, the improvement wherein each said means to puncture having a different puncturing pattern supplied thereto to achieve code diversity in the encoded data broadcast by each broadcast channel, respectively, and said radio broadcast channels are spatially diverse.

6. The digital radio broadcast system defined in claim 5 including at least one radio receiver for simultaneously receiving at least two of said plurality of radio broadcasting channels and means to depuncture the encoded data.

* * * * *